(12) United States Patent
Kobayashi et al.

(10) Patent No.: US 6,468,441 B1
(45) Date of Patent: Oct. 22, 2002

(54) MN-ZN FERRITE AND PRODUCTION PROCESS THEREOF

(75) Inventors: Osamu Kobayashi; Osamu Yamada; Kiyoshi Ito, all of Shizuoka-ken (JP)

(73) Assignee: Minebea Co., Ltd., Kitasaku-gun (JP)

( * ) Notice: Subject to any disclaimer, the term of this patent is extended or adjusted under 35 U.S.C. 154(b) by 27 days.

(21) Appl. No.: 09/795,133

(22) Filed: Mar. 1, 2001

(30) Foreign Application Priority Data

Mar. 15, 2000 (JP) ........................................ 2000-072265

(51) Int. Cl.$^7$ .......................... C04B 35/26; C04B 35/38; C10G 49/00
(52) U.S. Cl. ................. 252/62.56; 252/62.59; 252/62.62; 423/594; 501/126; 501/133; 501/134.1; 501/154
(58) Field of Search ........................... 252/62.59, 62.56, 252/62.62; 423/59; 501/126, 133, 134, 154

(56) References Cited

FOREIGN PATENT DOCUMENTS

| | | |
|---|---|---|
| DE | 17 71 921 A | 4/1972 |
| GB | 1 304 237 | 1/1973 |
| JP | 52-4753 B2 | 2/1977 |
| JP | 7-230909 A | 8/1995 |
| JP | 9-180925 A | 7/1997 |
| JP | 10-208926 A | 8/1998 |
| JP | 11-199235 A | 7/1999 |

OTHER PUBLICATIONS

"The measurement and research on magnetocrystalline antisotropy for the colbalt–doped MnZn Ferrite head material" Proc. Int. Symp. Phys. Magn. Mater., $2^{nd}$ (1992), vol. 1, 1992, pp. 372–375, XP000998604, No month.
Babbar V K et al., "Hot–Pressed MN–ZN–NI and MN–ZN–CO Ferrites for Magnetic Recording Heads", IEEE Transactions on Magnetics, US, IEEE Inc. New York, vol. 28, No. 1, 1992, pp. 21–26, XP000257981, No month.
Application Ser. No. 09/769,296, Kobayashi et al., filed Jan. 26, 2001.

Primary Examiner—Elizabeth D. Wood
(74) Attorney, Agent, or Firm—Oliff & Berridge, PLC

(57) ABSTRACT

The present invention provides a Mn—Zn ferrite having an electrical resistivity exceeding 1 Ωm order and a low core loss in a high frequency region exceeding 1 MHz. A basic component composition of the Mn—Zn ferrite includes 44.0 to 49.8 mol % of $Fe_2O_3$, 6.0 to 15.0 mol % of ZnO (15.0 mol % is excluded), 0.1 to 3.0 mol % of CoO, 0.02 to 1.20 mol % of $Mn_2O_3$, and the remainder of MnO. The Mn—Zn ferrite achieves desired purposes by controlling $Fe_2O_3$ content to a range less than 50 mol % that is the stoichiometric composition, adding a proper amount of CoO, restraining amount of $Mn_2O_3$ formation to 1.20 mol % or less, and further setting their average grain sizes to less than 10 μm.

7 Claims, No Drawings

MN-ZN FERRITE AND PRODUCTION PROCESS THEREOF

BACKGROUND OF THE INVENTION

1. Field of the Invention

The present invention relates to an oxide magnetic material having soft magnetism, and more particularly, to a Mn—Zn ferrite suitable for use as a switching power transformer, a rotary transformer and the like, and to a production process thereof.

2. Description of the Related Art

Typical oxide magnetic materials having soft magnetism include a Mn—Zn ferrite. This Mn—Zn ferrite of the prior art usually has a basic component composition containing 52 to 55 mol % of $Fe_2O_3$ on the average exceeding 50 mol % which is the stoichiometric composition, 10 to 24 mol % of ZnO and the remainder of MnO. And the Mn—Zn ferrite is usually produced by mixing the respective material powders of $Fe_2O_3$, ZnO and MnO in a prescribed ratio, subjecting the mixed powders to the respective steps of calcination, milling, component adjustment, granulation and pressing to obtain a prescribed shape, and then sintering the resulting product at 1200 to 1400° C. for 2 to 4 hours in a reducing atmosphere in which a relative partial pressure of oxygen is controlled to a low level by supplying nitrogen. The Mn—Zn ferrite is sintered in the reducing atmosphere in order to produce a part of $Fe^{3+}$ thereby forming $Fe^{2+}$. This $Fe^{2+}$ has positive crystal magnetic anisotropy and cancels negative crystal magnetic anisotropy of $Fe^{3}$ thereby enhancing soft magnetism.

Amount of the above-mentioned $Fe^{2+}$ formed depends on relative partial pressures of oxygen in sintering and cooling after the sintering. Therefore, when the relative partial pressure of oxygen is improperly set, it becomes difficult to ensure excellent soft magnetic properties. Thus, in the prior art, the following expression (1) has been experimentally established and the relative partial pressure of oxygen in sintering and in cooling after the sintering has been controlled strictly in accordance with this expression (1):

$$\log Po_2 = -14540/(T+273) + b \quad (1)$$

where T is temperature (° C.), $Po_2$ is a relative partial pressure of oxygen, and b is a constant. Usually, the constant b is set to 7 to 8. The fact the constant b is set to 7 to 8 means that the relative partial pressure of oxygen in the sintering must be controlled in a narrow range, which makes the sintering treatment very troublesome thereby increasing the production costs.

In recent years, with miniaturization and performance improvement of electronic equipments, there is an increasing tendency that frequencies of processing signals become higher. Thus, a magnetic material having excellent magnetic properties even in a higher frequency region has been needed.

However, when the Mn—Zn ferrite is used as a magnetic core material, as a frequency region applied becomes higher, an eddy current flows to result in a larger loss. Therefore, to extend the upper limit of the frequency at which the Mn—Zn ferrite can be used as a magnetic core material, an electrical resistivity of the material must be made as high as possible. However, since the above-mentioned usual Mn—Zn ferrite contains $Fe_2O_3$ in an amount larger than 50 mol % which is the stoichiometric composition, a large amount of $Fe^{2+}$ ion is present thereby making easy the transfer of electrons between the above-mentioned $Fe^{3+}$ and $Fe^{2+}$ ions. Thus, the electrical resistivity of the Mn—Zn ferrite is in the order of about 1 Ωm (order of one digit) or less. Accordingly, an applicable frequency is limited to about several hundred kHz maximum, and in a frequency region exceeding this limit, permeability (initial permeability) is significantly lowered and the properties of the soft magnetic material are completely lost.

In order to increase an apparent resistance of the Mn—Zn ferrite, in some cases, CaO, $SiO_2$ and the like are added as additive to impart a higher resistance to grain boundaries and at the same time the Mn—Zn ferrite is sintered at as low as about 1200° C. to diminish grain sizes from their usual dimension, about 20 μm, to 5 μm, thereby taking measures to increase the ratio of the grain boundary. However, even if such measures are adopted, it is difficult to obtain an electrical resistivity exceeding 1 Ωm order because resistance of the grain boundary itself is low, and the above-mentioned measures fall short of a thorough solution.

Further, a Mn—Zn ferrite in which, for example, CaO, $Sio_2$, $SnO_2$ and $TiO_2$ are added to obtain a higher resistance has been developed and is disclosed in Japanese Patent Application No. Hei 9-180925. However the electrical resistivity of the Mn—Zn ferrite is as low as 0.3 to 2.0 Ωm, which is insufficient for use in a high frequency region. Similarly, a Mn—Zn ferrite to which $SnO_2$ and the like are added is disclosed in EPC 1,304,237. The Mn—Zn ferrite described in this EPC patent contains as much as 3 to 7 mol % of $Fe^{2+}$. An electrical resistivity depends on amount of $Fe^{2+}$ as described above, and the electrical resistivities of the Mn—Zn ferrite in this EPC patent cannot exceed the electrical resistivities of a usual Mn—Zn ferrite of the prior art.

On the other hand, Mn—Zn ferrites which exhibit a higher resistance by containing less than 50 mol % of $Fe_2O_3$, have been developed for use as a core material for a deflection yoke and are disclosed in Japanese Patent Application Laid-open Nos. Hei 7-230909, Hei 10-208926, Hei 11-199235 and the like.

However, judging from the fact that their usage is a core material for a deflection yoke and from the examples of the invention described in each publication, the Mn—Zn ferrites described in any of the publications are ferrite materials intended for applications in a frequency region of 64 to 100 kHz. The purpose of setting $Fe_2O_3$ content to less than 50 mol % for a high electrical resistivity is to enable a copper wire to be wound directly around a core for a deflection yoke. In the ferrite materials, excellent magnetic properties are not obtained in such a high frequency region as exceeding 1 MHz. Thus, it does not enable the ferrites to be used as a magnetic core material in such a high frequency region as exceeding 1 MHz to only set the $Fe_2O_3$ content to less than 50 mol % for a high electrical resistivity.

Further, a Mn—Zn ferrite containing 50 mol % or less of $Fe_2O_3$ to which 1.3 to 1.5 mol % of CoO is added in order to decrease the temperature coefficient of initial permeability is disclosed in Japanese Examined Patent Publication No. Sho 52-4.753. This Mn—Zn ferrite is not intended for obtaining a property of low loss in such a high frequency region as exceeding 1 MHz, either, and relative partial pressure of oxygen in sintering and cooling after the sintering is not strictly controlled.

SUMMARY OF THE INVENTION

The present invention has been made in consideration of the above-mentioned conventional problems. An object of the present invention is to provide a Mn—Zn ferrite that has, of course, excellent magnetic properties and also has both a higher electrical resistivity than 1 Ωm order (a single digit order) and a low core loss in such a high frequency region as exceeding 1 MHz, and a production process as well, by which such a Mn—Zn ferrite can be obtained easily and inexpensively.

One of the Mn—Zn ferrites according to the present invention for attaining the above-mentioned object is characterized in that its basic component composition includes 44.0 to 49.8 mol % of $Fe_2O_3$, 6.0 to 15.0 mol % of ZnO (15.0 mol % is excluded), 0.1 to 3.0 mol % of CoO, 0.02 to 1.20 mol % of $Mn_2O_3$ and remainder of MnO, and that the average grain size is less than 10 μm.

Another Mn—Zn ferrite according to the present invention is characterized in that its basic component composition includes 44.0 to 49.8 mol % of $Fe_2O_3$, 6.0to 15.0 mol % of ZnO (15. 0 mol % is excluded), 0.1 to 3.0 mol % of CoO, 0.1 to 6.0 mol % of CuO, 0.02 to 1.20 mol % of $Mn_2O_3$ and remainder of MnO, and that the average grain size is less than 10 μm.

Still another Mn—Zn ferrite according to the present invention may contain as additive, in addition to the basic component compositions of the above-described two inventions, at least one component of 0.005 to 0.200 mass % of CaO, 0.005 to 0.050 mass % of $SiO_2$, 0.010 to 0.200 mass % of $ZrO_2$, 0.010 to 0.200 mass % of $Ta_2O_5$, 0.010 to 0.200 mass % of $HfO_2$ and 0.010 to 0.200 mass % of $Nb_2O_5$.

And, a production process according to the present invention to attain the above-mentioned object is characterized in that mixed powder whose components are adjusted so as to have the composition of the above-mentioned Mn—Zn ferrite is pressed, then sintered and cooled after the sintering down to 500° C. or lower in an atmosphere of a relative partial pressure of oxygen obtained by using an optional value selected from a range of 6 to 12 as a constant b in the aforementioned expression (1).

DETAILED DESCRIPTION OF THE INVENTION

In a usual Mn—Zn ferrite of the prior art, $Fe_2O_3$ content is larger than 50 mol % that is the stoichiometric composition, as described above. In order not to permit this excessive $Fe_2O_3$ to get precipitated as hematite, sintering and cooling must be conducted under a condition where a relative partial pressure of oxygen is reduced to a significantly lower level by flowing nitrogen, that is a condition where the constant b in the aforementioned expression (1) is set to 7 to 8. On the other hand, since in a Mn—Zn ferrite of the present invention, $Fe_2O_3$ content is 44.0 to 49.8 mol % that is less than 50 mol %, hematite hardly precipitates. Thus, even if a range of relative partial pressure of oxygen in sintering is somewhat widened, excellent magnetic properties can be obtained. Further, in the conventional Mn—Zn ferrite that contains more than 50 mol % of $Fe_2O_3$, about 3.0 mol % of $Fe^{2+}$ exists. On the other hand, in the Mn—Zn ferrite of the present invention, the $Fe^{2+}$ content is as low as 0.1 to 0.7 mol %. Accordingly, the electrical resistivity of the Mn—Zn ferrite of the present invention is very high. Therefore, even in a high frequency region, an eddy current is not increased so much and an excellent initial permeability can be obtained. However, if the $Fe_2O_3$ content is too small, the saturation magnetization is deteriorated. Thus, at least 44.0 mol % of $Fe_2O_3$ must be contained.

ZnO contained as main component affects the Curie temperature and the saturation magnetization. Too small amount of ZnO reduces the initial permeability, but on the contrary, too large amount of ZnO deteriorates the saturation magnetization and lowers the Curie temperature. Thus, since ferrite for power transformer is often used in an environment of about 80 to 100° C., it is particularly important that it has a high Curie temperature and a high saturation magnetization. Accordingly, ZnO content in the ferrite is set to the above-mentioned range of 6.0 to 15.0 mol % (15.0 mol % is excluded).

Since $Co^{2+}$ in CoO has a positive crystal magnetic anisotropy, CoO can cancel out a negative crystal magnetic anisotropy of $Fe^{3+}$ even if $Fe^{2+}$ having a positive crystal magnetic anisotropy exists only in a small amount. Further, $Co^{2+}$ has an effect of reducing a loss in a high frequency region by generating an induction magnetic anisotropy. However, when CoO content is too small, the effect is small. On the contrary when CoO content is too large, the magnetostriction increases and the initial permeability is decreased. Thus, CoO content is set to a range of 0.1 to 3.0 mol %.

A manganese component in the above-mentioned ferrite exists as $Mn^{2+}$ and $Mn^{3+}$. Since $Mn^{3+}$ strains a crystal lattice thereby significantly lowering the initial permeability, $Mn_2O_3$ content is set to 1.20 mol % or less. However, if $Mn_2O_3$ content is too small, the electrical resistivity is significantly decreased. Thus, at least 0.02 mol % of $Mn_2O_3$ must be contained in the ferrite.

In the present invention, the basic component composition may further include CuO. This CuO has an effect of enabling the ferrite to be successfully sintered at a low temperature. However, if the content thereof is too small, the effects are small. On the contrary if the content is too large, a core loss increases. Accordingly, the content is set to 0.1 to 6.0 mol %.

In the present invention, CaO, $SiO_2$, $ZrO_2$, $Ta_2O_5$, $HfO_2$ or $Nb_2O_5$ can be contained as additive. These additives have an action of accelerating crystal grain growth and are effective in diminishing an average grain size to less than 10 μm. However, if their contents are too small, the effect is small, and on the contrary if their contents are too large, abnormal grain growth occurs. Thus, CaO content is set to 0.005 to 0.200 mass %, $SiO_2$ content is set to 0.005 to 0.050 mass %, $ZrO_2$ content is set to 0.010 to 0.200 mass %, $Ta_2O_5$ content is set to 0.010 to 0.200 mass %, $HfO_2$ content is set to 0.010 to 0.200 mass %, and $Nb_2O_5$ content is set to 0.010 to 0.200 mass %.

The core loss of ferrite in a high frequency region comprises mainly eddy-current loss and residual loss. As described above, the Mn—Zn ferrite according to the present invention has a very high electrical resistivity and a small eddy-current loss. Further, since the Mn—Zn ferrite has a small average grain size of less than 10 μm, number of magnetic domain walls in a crystal grain is decreased, whereby the residual loss can be significantly decreased.

In the present invention, amount of $Mn^{3+}$ is controlled by conducting the sintering and the cooling after the sintering in an atmosphere of the relative partial pressure of oxygen obtained by using an optional value in a range of 6 to 12 as the constant b in the expression (1) described above. When a value larger than 12 is selected as the constant b, the amount of $Mn^{3+}$ in the ferrite increases to exceed 1.20 mol % whereby the initial permeability is rapidly decreased. Therefore, the amount of $Mn^{3+}$ in the ferrite must be decreased in order to increase the initial permeability. Thus, it is desirable to select a small value as the constant b. However, when a value smaller than 6 is selected, the electrical resistivity is significantly decreased by the fact that amount of $Fe^{2+}$ increases or amount of $Mn^{3+}$ decreases to be too small. Accordingly, the constant b is set to at least 6.

In the production of a Mn—Zn ferrite, respective raw material powders of $Fe_2O_3$, ZnO, CoO, $Mn_2O_3$ and MnO as main component are previously weighed for a prescribed ratio, and mixed. Then this mixed powder is calcined and finely milled. The calcining temperature slightly differs depending on target composition and an appropriate temperature can be selected from a range of 800 to 1000° C. A general purpose ball mill can be used for fine milling of the calcined powder. When CaO, $SiO_2$, $ZrO_2$, $Ta_2O_5$, $HfO_2$ or $Nb_2O_5$ is made to be contained as additive, proper amount of powders of the respective additives are added to the calcined and fine milled powder and mixed to obtain a mixture having a target composition, which is then granulated and pressed in accordance with a usual ferrite production process, and sintered at 1000 to 1400° C. A process of adding a binder such as polyvinyl alcohol, polyacrylamide, methyl cellulose, polyethylene oxide, glycerin or the like can be used for the granulation, and a process of applying a pressure of, for example, 80 MPa or more can be used for the pressing.

In the above-mentioned sintering and cooling after the sintering, a relative partial pressure of oxygen is controlled by flowing inert gas such as nitrogen gas or the like into a sintering furnace. In this case, an optional value in a range of 6 to 12 can be selected as the constant b in the aforementioned expression (1), which provides a larger allowance as compared to the constant b (7 to 8) selected in a case where a usual Mn—Zn ferrite of the prior art containing more than 50 mol % of $Fe_2O_3$ is sintered, so the relative partial pressure of oxygen can be easily controlled. Further, in this case, the cooling after the sintering needs to be performed in accordance with the above-mentioned expression only until the temperature gets down to 500° C. because the reaction of oxidation or reduction, at a temperature lower than 500° C., can be ignored independent of relative partial pressures of oxygen.

EXAMPLES

Example 1

Respective raw material powders of $Fe_2O_3$, CoO, MnO, $Mn_2O_3$ and ZnO were taken to obtain a composition with 42.0 to 51.0 mol % of $Fe_2O_3$, 0 to 4 mol % of CoO, and remainder of MnO, $Mn_2O_3$ and ZnO having a molar ratio of MnO to ZnO being 3:1 when $Mn_2O_3$ is regarded as MnO, and mixed with a ball mill. The obtained mixed powder was calcined in the air at 850° C. for 2 hours and was milled with the ball mill for 20 hours to thereby obtain calcined and fine milled powder. Then, the component of this calcined and fine milled powder was adjusted so as to obtain the previously defined composition, and the adjusted mixture was further mixed with the ball mill for one hour, granulated with addition of polyvinyl alcohol and pressed at a pressure of 80 MPa into toroidal cores (green compacts) each having an outer diameter of 18 mm, an inner diameter of 10 mm and a height of 4 mm. The green compacts were placed in a sintering furnace where an atmosphere was adjusted by allowing nitrogen to flow thereinto so as to have a relative partial pressure of oxygen as obtained by setting the constant b to 8 in the expression (1), and sintered at 1200° C. for 2 hours and cooled after the sintering, and samples 1-1 to 1-9 shown in Table 1 were obtained.

Average grain sizes of the respective samples 1-1 to 1-9 thus obtained were measured by observation with a metallurgical microscope. The results showed the average grain sizes of all the samples were about 7 μm. Additionally, final component composition of the above-mentioned samples 1-1 to 1-9 was checked by a fluorescent X ray analysis, and also their electrical resistivity, initial permeability at 2 MHz and core loss at 2 MHz-25 mT were measured. The results are shown together in Table 1.

TABLE 1

| Sample No. | Classification | Basic component Composition (mol %) | | | | Electrical Resistivity (Ωm) | Initial Permeability | Core Loss (kW/m³) |
| | | $Fe_2O_3$ | MnO* | ZnO | CoO | | | |
| --- | --- | --- | --- | --- | --- | --- | --- | --- |
| 1-1 | Comparative Sample | 51.0 | 36.7 | 12.2 | 0.1 | 0.8 | 30 | >3000 |
| 1-2 | Comparative Sample | 50.2 | 37.3 | 12.4 | 0.1 | 1.2 | 50 | 2700 |
| 1-3 | Present Invention | 49.8 | 37.6 | 12.5 | 0.1 | 130 | 520 | 930 |
| 1-4 | Present Invention | 49.0 | 37.9 | 12.6 | 0.5 | 190 | 600 | 690 |
| 1-5 | Comparative Sample | 47.0 | 39.8 | 13.2 | 0 | 290 | 280 | 1900 |
| 1-6 | Present Invention | 47.0 | 39.0 | 13.0 | 1.0 | 260 | 720 | 580 |
| 1-7 | Comparative Sample | 47.0 | 36.8 | 12.2 | 4.0 | 370 | 330 | 1520 |
| 1-8 | Present Invention | 44.0 | 39.8 | 13.2 | 3.0 | 330 | 540 | 770 |
| 1-9 | Comparative Sample | 42.0 | 42.8 | 14.2 | 1.0 | 380 | 420 | 1430 |

*Mn is counted as MnO

As apparent from the results shown in Table 1, all the samples 1-3 to 1-9 each containing less than 50 mol % of $Fe_2O_3$ have significantly higher electrical resistivities than the samples 1-1 and 1-2 each containing more than 50 mol % of $Fe_2O_3$. Further, out of these samples, excellent values of core loss measuring 1000 kW/m³ or less are obtained on the samples 1-3, 1-4, 1-6 and 1-8 of the present invention containing 44.0 to 49.8 mol % of $Fe_2O_3$, and 0.1 to 3.0 mol % of CoO.

Example 2

Respective raw material powders were taken and mixed with each other with a ball mill so as to have the same composition as the sample 1-6 of Example 1, and toroidal cores (green compacts) each having an outer diameter of 18 mm, an inner diameter of 10 mm and a height of 4 mm were formed under the same conditions as Example 1. The green compacts were placed into a sintering furnace where an atmosphere was adjusted by allowing nitrogen to flow thereinto so as to have a relative partial pressure of oxygen as obtained by variously changing the constant b in the expression (1) in a range of 5.5 to 15, then sintered at 1200° C. for 2 hours and cooled after the sintering, and samples 2-1 to 2-5 shown in Table 2 were obtained.

Average grain size of the samples 2-1 to 2-5 thus obtained was measured by observation with a metallurgical microscope. The results showed the average grain sizes of all the samples were about 7 μm. Additionally, electrical resistivity and core loss at 2 MHz-25 mT of the above-mentioned samples 2-1 to 2-5 were measured, and also amounts of $Mn_2O_3$ were analyzed by a titration method. The results are shown together in Table 2.

into a sintering furnace where an atmosphere was adjusted by allowing nitrogen to flow thereinto so as to have a relative partial pressure of oxygen as obtained by setting the constant b to 8 in the expression (1), then sintered at 1100° C. and 1200° C. for 2 hours and cooled after the sintering, and samples 3-1 to 3-4 shown in Table 3 were obtained.

Average grain size of the samples 3-1 to 3-4 thus obtained was measured by observation with a metallurgical microscope. The results showed the average grain sizes of all the samples were in a range of about 5 to 9 μm. Additionally, final component composition of the above-mentioned samples 3-1 to 3-4 was checked by a fluorescent X-ray analysis, and also their core loss at 2 MHz-25 mT was measured. The results are shown together in Table 3.

TABLE 3

| Sample No. | Classification | Basic Component Composition (mol %) | | | | | Core Loss at each Sintering Temperature (kW/m³) | |
|---|---|---|---|---|---|---|---|---|
| | | $Fe_2O_3$ | MnO* | ZnO | CoO | CuO | 1200° C. | 1100° C. |
| 3-1 | Present Invention | 47.0 | 39.0 | 13.0 | 1.0 | — | 580 | 1150 |
| 3-2 | Present Invention | 47.0 | 36.8 | 12.2 | 1.0 | 3.0 | 940 | 610 |
| 3-3 | Present Invention | 47.0 | 34.5 | 11.5 | 1.0 | 6.0 | 1220 | 810 |
| 3-4 | Comparative Sample | 47.0 | 33.8 | 11.2 | 1.0 | 7.0 | 1790 | 1340 |

*Mn is counted as MnO

TABLE 2

| Sample No. | Classification | b Constant | Electrical Resistivity (Ωm) | Core Loss (kW/m³) | $Mn_2O_3$ (mol %) |
|---|---|---|---|---|---|
| 2-1 | Comparative Sample | 5.5 | 60 | 1130 | 0.01 |
| 2-2 | Present Invention | 6 | 190 | 850 | 0.20 |
| 2-3 | Present Invention | 9 | 300 | 590 | 0.62 |
| 2-4 | Present Invention | 12 | 360 | 920 | 1.20 |
| 2-5 | Comparative Sample | 15 | 410 | 1220 | 1.42 |

As can be seen from the results shown in Table 2, all of the samples 2-2 to 2-4 of the present invention sintered in the atmospheres of the relative partial pressures of oxygen obtained by setting the constant b in the expression (1) to 6 to 12 had a small core loss. However, since the comparative sample 2-1 sintered in the atmosphere of the relative partial pressure of oxygen obtained by setting the constant b to 5.5 has a low electrical resistivity, and, since the comparative sample 2-5 obtained by setting the constant b to 15 has a large amount of $Mn_2O_3$ that is 1.2 mol %, both the comparative samples had such a large value of core loss as exceeding 1000 kW/m³.

Example 3

Respective raw material powders were taken and mixed with each other with a ball mill to obtain a composition with 47.0 mol % of $Fe_2O_3$, 1.0 mol % of CoO, 0 to 7.0 mol % of CuO, and remainder of MnO, $Mn_2O_3$ and ZnO having a molar ratio of MnO to ZnO being 3:1 when $Mn_2O_3$ is regarded as MnO, and toroidal cores (green compacts) each having an outer diameter of 18 mm, an inner diameter of 10 mm and a height of 4 mm were formed under the same conditions as Example 1. The green compacts were placed As apparent from the results shown in Table 3, in the sample 3-1 (the present invention) containing no CuO, a sintering temperature of 1200° C. must be selected to realize a low loss of 1000 kW/m³ or less. On the other hand, in the samples 3-2 and 3-3 of the present invention each containing a proper amount of CuO, a low sintering temperature of 1100° C. could realize a low loss of 1000 kW/m³ or less. However, in the comparative sample 3-4 containing CuO exceeding the proper amount thereof, core loss was increased at any sintering temperature selected.

Example 4

Respective raw material powders were taken and mixed with each other with a ball mill so as to have the same composition as the sample 1-6 of Example 1 or the sample 3-2 of Example 3, and toroidal cores (green compacts) having an outer diameter of 18 mm, an inner diameter of 10 mm and a height of 4 mm were formed under the same conditions as Example 1. The green compacts were placed into a sintering furnace where an atmosphere was adjusted by allowing nitrogen to flow thereinto so as to have a relative partial pressure of oxygen as obtained by setting the constant b to 8 in the expression (1), sintered at 1100 to 1300° C. for 2 hours and cooled after the sintering, and samples 4-1 to 4-6 shown in Table 4, were obtained.

Average grain size of the samples 4-1 to 4-6 thus obtained was measured by observation with a metallurgical microscope, and then core loss at 2 MHz-25 mT was measured. The results are shown together in Table 4.

TABLE 4

| Sample No. | Classification | Basic Component Composition | Sintering Temperature (° C.) | Average Grain Size (μm) | Core Loss (kW/m³) |
|---|---|---|---|---|---|
| 4-1 | Present Invention | Same as Sample 3-2 | 1100 | 6 | 610 |
| 4-2 | Present Invention | Same as Sample 3-2 | 1150 | 9 | 960 |
| 4-3 | Comparative Sample | Same as Sample 3-2 | 1200 | 10 | 1020 |
| 4-4 | Present Invention | Same as Sample 1-6 | 1200 | 7 | 580 |
| 4-5 | Comparative Sample | Same as Sample 1-6 | 1250 | 11 | 1090 |
| 4-6 | Comparative Sample | Same as Sample 1-6 | 1300 | 16 | 1230 |

As can be seen from the results shown in Table 4, the samples 4-1, 4-2 and 4-4 of the present invention each having a grain size of less than 10 μm have a low core loss of less than 1000 kW/m³. On the other hand, the comparative samples 4-3, 4-5 and 4-6 each having a grain size of 10 μm or more have a large core loss of more than 1000 kW/m³.

Example 5

Respective raw material powders were taken and mixed with each other with a ball mill so as to have the same composition as in the sample 1-6 of Example 1 or the sample 3-2 of Example 3, and the mixed powder was calcined in the air at 850° C. for 2 hours and milled with the ball mill for 20 hours thereby to obtain a calcined and fine milled powder. Then, while the component of this fine milled powder was adjusted for the previously defined composition, CaO, SiO$_2$, ZrO$_2$, Ta$_2$O$_5$, HfO$_2$ or Nb$_2$O$_5$ was added to the fine milled powder as additive, and the adjusted mixture was further mixed with the ball mill for one hour, granulated with addition of polyvinyl alcohol and pressed at a pressure of 80 MPa into toroidal cores (green compacts) having an outer diameter of 18 mm, an inner diameter of 10 mm and a height of 4 mm. The green compacts were placed into a sintering furnace where an atmosphere was adjusted by allowing nitrogen to flow thereinto so as to have a relative partial pressure of oxygen as obtained by setting the constant b to 8 in the expression (1), sintered at 1100° C. or 1200° C. for 2 hours and cooled after the sintering, and samples 5-1 to 5-8 shown in Table 5 were obtained.

Average grain size of the samples 5-1 to 5-8 thus obtained was measured by observation with a metallurgical microscope, and core loss at 2 MHz-25 mT was measured. The results are shown together in Table 5.

TABLE 5

| Sample No. | Classification | Additive (mol %) | Basic Component Composition | Sintering Temperature (° C.) | Average Grain Size (μm) | Core Loss (kW/m³) |
|---|---|---|---|---|---|---|
| 3-2 | Present Invention | — | Refer to Table 3 | 1100 | 7 | 610 |
| 5-1 | Present Invention | Nb$_2$O$_5$ 0.050 | Same as Sample 3-2 | 1100 | 5 | 590 |
| 5-2 | Present Invention | HfO$_2$ 0.050 | Same as Sample 3-2 | 1100 | 4 | 600 |
| 5-3 | Present Invention | SiO$_2$ 0.005 | Same as Sample 3-2 | 1100 | 5 | 600 |
| 1-6 | Present Invention | — | Refer to Table 1 | 1200 | 7 | 580 |
| 5-4 | Present Invention | Ta$_2$O$_5$ 0.050 | Same as Sample 1-6 | 1200 | 5 | 570 |
| 5-5 | Present Invention | ZrO$_2$ 0.050 | Same as Sample 1-6 | 1200 | 4 | 550 |
| 5-6 | Present Invention | CaO 0.005 | Same as Sample 1-6 | 1200 | 6 | 570 |
| 5-7 | Present Invention | CaO 0.200 | Same as Sample 1-6 | 1200 | 4 | 560 |
| 5-8 | Comparative Sample | CaO 0.300 | Same as Sample 1-6 | 1200 | 3 | 1530 |

As can be seen from Table 5, all the samples 5-1 to 5-7 of the present invention to each of which a suitable amount of the additive was added have grain growth more restrained and core loss improved compared with the samples 1-6 and 3-2 (the present invention) to each of which no additive was added. However, the comparative sample 5-8 to which an excess amount of the additive was added has an abnormal grain growth and incurs a significant deterioration in core loss.

As described above, the Mn—Zn ferrite of the present invention, which contains 44.0 to 49.8 mol % of Fe$_2$O$_3$, that is less than the stoichiometric composition, 0.1 to 3.0 mol % of CoO and 0.02 to 1.20 mol % of Mn$_2$O$_3$, and has an average grain size of less than 10 μm, obtains not only high electrical resistivities exceeding 1 Ωm order but also low core losses in a high frequency region exceeding 1 MHz. Further, the Mn—Zn ferrite of the present invention has excellent magnetic properties, and the utility thereof is significantly enhanced.

Also, when 0.1 to 6.0 mol % of CuO is contained as a basic component, sintering can be conducted at a low temperature whereby the energy consumption can be reduced to a minimum possible.

In addition, when a proper amount of CaO, SiO$_2$, ZrO$_2$, Ta$_2$O$_5$, HfO$_2$, Nb$_2$O$_5$ or the like is contained as additive, the core loss in a high frequency region is further improved.

Further, according to the production process of the Mn—Zn ferrite of the present invention, the strict control of the relative partial pressure of oxygen during and after sintering is not needed. Thus, the production process of the present invention contributes significantly to stabilization of the production of the Mn—Zn ferrite and to cost reduction thereof.

What is claimed is:

1. A Mn—Zn ferrite, characterized in that its basic component composition comprises: 44.0 to 49.8 mol % of Fe$_2$O$_3$; 6.0 to 15.0 mol % of ZnO (15.0 mol % is excluded); 0.1 to 3.0 mol % of CoO; 0.02 to 1.20 mol % of Mn$_2$O$_3$; and remainder of MnO, and that its average grain size is less than 10 μm.

2. A Mn—Zn ferrite, characterized in that its basic component composition comprises: 44.0 to 49.8 mol % of Fe$_2$O$_3$; 6.0 to 15.0 mol % of ZnO (15.0 mol % is excluded); 0.1 to 3.0 mol % of CoO; 0.1 to 6.0 mol % of CuO; 0.02 to 1.20 mol % of Mn$_2$O$_3$; and remainder of MnO, and that its average grain size is less than 10 μm.

3. The Mn—Zn ferrite according to claim 1 further containing as additive at least one component selected from the group consisting of: 0.005 to 0.200 mass % of CaO;

0.005 to 0.050 mass % of $SiO_2$; 0.010 to 0.200 mass % of $ZrO_2$; 0.010 to 0.200 mass % of $Ta_2O_5$; 0.010 to 0.200 mass % of $HfO_2$; and 0.010 to 0.200 mass % of $Nb_2O_5$.

4. production process of Mn—Zn ferrite, characterized in that a mixed powder whose components are adjusted so as to have the composition of the Mn—Zn ferrite according to claim 1 is pressed, then sintered and cooled after the sintering down to 500° C. or lower in an atmosphere of a relative partial pressure of oxygen defined as the following expression:

$$\log Po_2 = -14540/(T+273) + b$$

where T is temperature (° C.), $Po_2$ is a relative partial pressure of oxygen, and b is a constant selected from a range of 6 to 12.

5. The Mn—Zn ferrite according to claim 2 further containing as additive at least one component selected from the group consisting of: 0.005 to 0.200 mass % of CaO; 0.005 to 0.050 mass % of $SiO_2$; 0.010 to 0.200 mass % of $ZrO_2$; 0.010 to 0.200 mass % of $Ta_2O_5$; 0.010 to 0.200 mass % of $HfO_2$; and 0.010 to 0.200 mass % of $Nb_2O_5$.

6. production process of Mn—Zn ferrite, characterized in that a mixed powder whose components are adjusted so as to have the composition of the Mn—Zn ferrite according to claim 2 is pressed, then sintered and cooled after the sintering down to 500° C. or lower in an atmosphere of a relative partial pressure of oxygen defined as the following expression:

$$\log Po_2 = -14540/(T+273) + b$$

where T is temperature (° C.), $Po_2$ is a relative partial pressure of oxygen, and b is a constant selected from a range of 6 to 12.

7. production process of Mn—Zn ferrite, characterized in that a mixed powder whose components are adjusted so as to have the composition of the Mn—Zn ferrite according to claim 3 is pressed, then sintered and cooled after the sintering down to 500° C. or lower in an atmosphere of a relative partial pressure of oxygen defined as the following expression:

$$\log Po_2 = -14540/(T+273) + b$$

where T is temperature (° C.), $Po_2$ is a relative partial pressure of oxygen, and b is a constant selected from a range of 6 to 12.

* * * * *